US012374012B2

(12) United States Patent
Sun et al.

(10) Patent No.: US 12,374,012 B2
(45) Date of Patent: Jul. 29, 2025

(54) VIDEO SHARING METHOD AND APPARATUS, DEVICE, AND MEDIUM

(71) Applicant: Beijing Zitiao Network Technology Co., Ltd., Beijing (CN)

(72) Inventors: Hui Sun, Beijing (CN); Daoyu Wang, Beijing (CN); Yiying Wu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/496,680

(22) Filed: Oct. 27, 2023

(65) Prior Publication Data

US 2024/0062443 A1    Feb. 22, 2024

Related U.S. Application Data

(63) Continuation of application No. PCT/CN2022/095721, filed on May 27, 2022.

(30) Foreign Application Priority Data

Jun. 2, 2021 (CN) .......................... 202110615690.1

(51) Int. Cl.
*G06T 11/60* (2006.01)
*G06F 3/04842* (2022.01)
*H04N 21/2743* (2011.01)

(52) U.S. Cl.
CPC .......... *G06T 11/60* (2013.01); *G06F 3/04842* (2013.01); *H04N 21/2743* (2013.01)

(58) Field of Classification Search
None
See application file for complete search history.

(56) References Cited

U.S. PATENT DOCUMENTS

2012/0311624 A1    12/2012  Oskolkov et al.
2014/0047297 A1*   2/2014   Shin ................. H03M 13/2721
                                                           714/758

(Continued)

FOREIGN PATENT DOCUMENTS

CN          106162300 A      11/2016
CN          107277634 A      10/2017

(Continued)

OTHER PUBLICATIONS

Make Knowledge Free, "How to Upload Multiple Videos to Facebook", youtube.com, Oct. 1, 2017, URL: https://www.youtube.com/watch?v=VIMsHBYVI_U (Year: 2017).*

(Continued)

*Primary Examiner* — David H Chu
(74) *Attorney, Agent, or Firm* — Alleman Hall & Tuttle LLP

(57) ABSTRACT

The present disclosure relates to a video sharing method and apparatus, a device, and a medium. The video sharing method includes: displaying a target object in a target interactive interface, the target object comprising at least one among a target video to be shared or a sharing control of a target video, wherein the target video is a historically posted video; when a first trigger operation on the target object is detected, displaying a preset playing interface, a composite video used for sharing the target video being displayed within the preset play interface, the composite video comprising the target video and visual material, and the visualization material being generated according to the target video.

18 Claims, 8 Drawing Sheets

(56) References Cited

U.S. PATENT DOCUMENTS

| | | | |
|---|---|---|---|
| 2014/0067825 A1* | 3/2014 | Oztaskent | G06F 16/9536 |
| | | | 707/E17.014 |
| 2014/0189535 A1 | 7/2014 | Simonyi et al. | |
| 2019/0180790 A1* | 6/2019 | Rehman | G06F 3/04842 |
| 2019/0332269 A1* | 10/2019 | Greenwood | G06F 3/065 |
| 2021/0035609 A1 | 2/2021 | Zhao et al. | |
| 2021/0168473 A1 | 6/2021 | Li | |
| 2021/0225406 A1 | 7/2021 | Han et al. | |
| 2021/0274106 A1 | 9/2021 | Liu et al. | |
| 2021/0304797 A1* | 9/2021 | Kim | H04N 5/272 |
| 2022/0279239 A1 | 9/2022 | Wang et al. | |
| 2022/0394343 A1 | 12/2022 | Sun et al. | |
| 2023/0326110 A1 | 10/2023 | Sun et al. | |

FOREIGN PATENT DOCUMENTS

| | | |
|---|---|---|
| CN | 108124195 A | 6/2018 |
| CN | 109275028 A | 1/2019 |
| CN | 109379623 A | 2/2019 |
| CN | 110636382 A | 12/2019 |
| CN | 110868639 A | 3/2020 |
| CN | 110909180 A | 3/2020 |
| CN | 110933511 A | 3/2020 |
| CN | 111343074 A | 6/2020 |
| CN | 111526411 A | 8/2020 |
| CN | 111880874 A | 11/2020 |
| CN | 112862927 A | 5/2021 |
| CN | 113365133 A | 9/2021 |
| JP | 2017510171 A | 4/2017 |
| WO | 2019100757 A1 | 5/2019 |
| WO | 2021093737 A1 | 5/2021 |

OTHER PUBLICATIONS

Jerry Potter, "Posting Video To Facebook Business Page", youtube.com, Jun. 21, 2018, URL: https://www.youtube.com/watch?v=UxVZwvGihVM&t=221s (Year: 2018).*

China National Intellectual Property Administration, Office Action and Search Report Issued in Application No. 202110615690.1, Apr. 15, 2022, 9 pages.

China National Intellectual Property Administration, Notice of Allowance Issued in Application No. 202110615690.1 Sep. 8, 2022, 5 pages.

China National Intellectual Property Administration, Written Opinion Issued in Application No. PCT/CN2022/095721, Aug. 5, 2022, WIPO, 10 pages.

International Bureau of WIPO, International Preliminary Report on Patentability Issued in Application No. PCT/CN2022/095721, Nov. 21, 2023, WIPO, 10 pages.

Constine, J., "Instagram launches Create mode with On This Day throwbacks," TechCrunch, Available Online at https://techcrunch.com/2019/10/08/instagram-create-mode/, Oct. 8, 2019, 3 pages.

Digital Unraveled, "How to Repost Autoplay Video on Instagram Story (2021)," Youtube, Available Online at https://www.youtube.com/watch?v=MYm-5UYqiaU, Apr. 12, 2021, 2 pages.

European Patent Office, Extended European Search Report Issued in Application No. 22815187.4, Oct. 2, 2024, 34 pages.

Gayle, H., "How to Change the Background When You Share a Post to Your Instagram Story," Media A La Carte, Available Online at https://www.mediaalacarte.com/post/how-to-change-the-background-when-you-share-a-post-to-your-instagram-story, Jan. 18, 2021, 2 pages.

Techno Window, "How To Use Instagram's 'On This Day' Feature," Youtube, Available Online at https://www.youtube.com/watch?v=pO88shay-GA, Sep. 17, 2020, 2 pages.

Addition of "all views" to the Instar Stroy Creation Mode (created), Koukichi Takahashi Photography, available online at Https://koukichi-t.com/archives/26194, available as early as Dec. 11, 2024, 33 pages.

Japan Patent Office, Notice of Reasons for Refusal for Japanese Patent Application No. 2023-574226, Dec. 17, 2024, 9 Pages.

European Patent Office, Communication Pursuant to Rules 70(2) and 70a(2) EPC for European Application No. 22815187.4, mailed Oct. 22, 2024, 1 page.

* cited by examiner

VIDEO SHARING METHOD AND APPARATUS, DEVICE, AND MEDIUM

CROSS-REFERENCE TO RELATED APPLICATIONS

The present disclosure is a continuation of International Patent Application No. PCT/CN2022/095721, filed on May 27, 2022, which is based on and claims priority of Chinese application for invention No. 202110615690.1, filed on Jun. 2, 2021, the disclosure of which is hereby incorporated into this disclosure by reference in its entirety.

TECHNICAL FIELD

This disclosure relates to the technical field of video processing technology, in particular to a video sharing method, apparatus, device and medium.

BACKGROUND

With the rapid development of computer technology and mobile communication technology, various electronic devices based video platforms have been widely used, which can greatly enrich our daily lives.

In related technologies, when users find interesting video content on a video platform, they usually forward the video content directly to share the video content.

SUMMARY

In a first aspect, the present disclosure provides a video sharing method, comprising: displaying a target object in a target interaction interface, the target object comprising a target video to be shared and/or a sharing control for the target video, wherein the target video is a historically posted video; in response to a first trigger operation on the target object is detected, displaying a preset playing interface, in which a composite video for sharing the target video is displayed, the composite video comprising the target video and a visualization material generated based on the target video.

In a second aspect, the present disclosure provides a video sharing apparatus, comprising: a first display unit configured for displaying a target object in a target interaction interface, the target object comprising a target video to be shared and/or a sharing control for the target video, wherein the target video is a historically posted video; a second display unit configured for, in response to a first trigger operation on the target object is detected, displaying a preset playing interface, in which a composite video for sharing the target video is displayed, the composite video comprising the target video and visualization material generated based on the target video.

In a third aspect, the present disclosure provides an electronic device, comprising: a processor; a memory for storing executable instructions; the processor is configured to read the executable instructions from the memory and perform the executable instructions to implement the video sharing method described in the first aspect.

In a fourth aspect, the present disclosure provides a computer readable storage medium storing thereon a computer program that, when executed by a processor, causes the processor to implement the video sharing method described in the first aspect.

In a fifth aspect, the present disclosure provides a computer program, comprising: instructions that, when executed by a processor, cause the processor to implement the video sharing method of any embodiment above.

In a sixth aspect, the present disclosure provides a computer program product comprising instructions that, when executed by a processor, cause the processor to implement the video sharing method of any embodiment above.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

DETAILED DESCRIPTION

Figure 1:
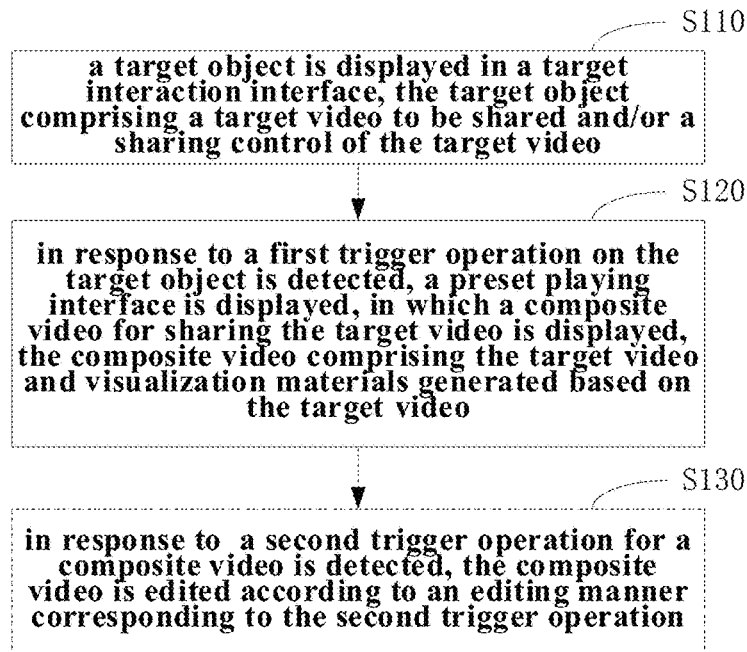
FIG. 1 is a flowchart of a video sharing method according to embodiments of the present disclosure.

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless clearly indicated in the context, they should be understood as "one or more".

The names of messages or information exchanged between multiple devices in the embodiments of the present disclosure are only used for illustrative purposes, and are not used to limit the scope of these messages or information.

In related technologies, when users find interesting video content on a video platform, they usually forward the video content directly to share the video content.

However, users must find a deep entry point through a series of complex operations, and via this entry point, post the video content to their personal updates or forward it to friends through private messages to achieve the forwarding of the video content, which cannot achieve rapid sharing of the video content. It also makes it difficult for viewers browsing the video content to determine whether the video content was shared by a user or posted by the user, thereby reducing the recognition of video sharing. In addition, viewers cannot interact with the sharer within the video content.

To address the above issues, embodiments of the present disclosure provides a video sharing method, apparatus, device, and medium that can intelligently generate a highly recognizable composite video to share video content that is interesting to users and lower the threshold of video production.

Below, a video sharing method provided in embodiments of the present disclosure will be explained with reference to FIGS. 1-14.

In the embodiment of the present disclosure, the video sharing method may be executed by an electronic device. The electronic device in the embodiment of the present disclosure may comprise, but is not limited to, a mobile terminal, such as a mobile phone, a notebook computer, a digital broadcast receiver, a PDA (personal digital assistant), a PAD (tablet), a PMP (portable multimedia player), a vehicle-mounted terminal (such as a vehicle-mounted navigation terminal), a wearable device, etc., or a fixed terminal such as a digital TV, a desktop computer, a smart home device, etc.

FIG. 1 is a flowchart of a video sharing method according to embodiments of the present disclosure.

As shown in FIG. 1, the video sharing method may comprise the following steps.

In S110, a target object is displayed in a target interaction interface, the target object comprising a target video to be shared and/or a sharing control for the target video.

In some embodiments of the disclosure, the target interaction interface can be an interface for information exchange between a user and an electronic device, which can provide the user with information, e.g., displaying a target object, and can also receive information or operations input by the user, e.g., receiving a user operation on the target object.

In some embodiments, the target object may comprise a target video to be shared, wherein the target video may be a historically posted video.

In some embodiments, the target video may be a public video that the user has already distributed to other users through a server, or a private video that the user has posted and saved to the server. The target video may also be a public video distributed to the user from others via the server and viewed by the user.

In other embodiments, the target object may comprise a sharing control for the target video.

The sharing control for the target video may be a control used to trigger the sharing of the target video. For example, the control may be an object that can be triggered by a user, such as a button, an icon, etc.

In S120, in response to a first trigger operation on the target object is detected, a preset playing interface is displayed, in which a composite video for sharing the target video is displayed, the composite video comprising the target video and a visualization material generated based on the target video.

In the embodiments of the present disclosure, in response to a user wants to share an interesting target video, a first trigger operation on the target object can be input to the electronic device. The first trigger operation can be an operation used to trigger the sharing of the target video. After the electronic device detects the first trigger operation on the target object, it can display a preset playing interface containing a composite video, the composite video comprising the target video and visualization materials. Due to the ability to display the video content of the target video, the composite video can be used to share the target video. That is, a user can share the target video by sharing the composite video.

In the embodiments of the present disclosure, video frames of the target video can be displayed at a preset display position in the composite video according to a preset display size and a preset display angle.

In some embodiments of the disclosure, the visualization materials in the composite video are generated based on the target video. The visualization materials are video elements that can be viewed in composite video.

In some embodiments, visualization materials comprise images and/or text generated based on the target video.

In some embodiments, the visualization materials may comprise images and/or text generated based on the relevant content of the target video.

In some embodiments, the video sharing method may comprise S130. In S130, in response to a second trigger operation for a composite video is detected, the composite video is edited according to an editing method corresponding to the second trigger operation.

In the embodiments of the present disclosure, in response to a user wants to perform video editing on a composite video, a second trigger operation on the composite video can be input to the electronic device. The second trigger operation can be an operation used to trigger the editing of the target video. After the second trigger operation on the composite video is detected, the electronic device can perform video editing on the composite video according to an editing method corresponding to the second trigger operation.

In some embodiments, the second trigger operation can be used to trigger the editing of at least one of: video frames of the composite video, background music of the composite video, or visualization materials of the composite video, which will be explained in detail later.

In the embodiments of the present disclosure, in response to a user triggers video sharing of a target video, a preset playing interface can be directly displayed. The preset playing interface can display a composite video that is automatically generated based on the target video, and comprises the target video and visualization materials. By sharing the target video using the composite video, there can be a significant difference in the presentation form between the composite video and the target video, which enables viewers to distinguish between the original video and the shared video by the presentation form of the video, thereby improving the recognition of video sharing. Moreover, the user can also edit the target video according to an editing method corresponding to a second trigger operation in the preset playing interface, to enrich the shared content to meet the personalized needs of the user, so that the threshold of video production can be lowered.

In other embodiments of the present disclosure, in order to improve the convenience of the user for sharing a target video, multiple triggering methods can be provided for the user to share the target video.

In some embodiments of the present disclosure, the target interaction interface may comprise an video presentation interface of a target video. The target object may comprise the target video and a sharing control for the target video.

The video presentation interface may be an interface that can be used to play back the target video. In some embodiments, the target object can be displayed in the video presentation interface of the target video. In this case, the target object may comprise the target video and a sharing control for the target video. For example, the sharing control for the target video may be a share button of the target video or a share icon of the target video.

In some embodiments, the first trigger operation may comprise a gesture control operation (such as a click, a long press, a double click, etc.) on the sharing control for the target video, a voice control operation, or an emotion control operation.

The technical solution provided in the embodiments of the present disclosure has the following advantages over the related art.

According to the video sharing method, apparatus, device and medium of the embodiments of the present disclosure, in response to a user triggers video sharing of a target video, a preset playing interface can be directly displayed. The preset playing interface can display a composite video that is automatically generated based on the target video, and comprises the target video and visualization materials. By sharing the target video using the composite video, there can be a significant difference in the presentation form between the composite video and the target video, which enables viewers to distinguish between the original video and the shared video by the presentation form of the video, thereby improving the recognition of video sharing. Moreover, the user can also edit the target video according to an editing method corresponding to a second trigger operation in the preset playing interface, to enrich the shared content to meet the personalized needs of the user, so that the threshold of video production can be lowered.

Figure 2:
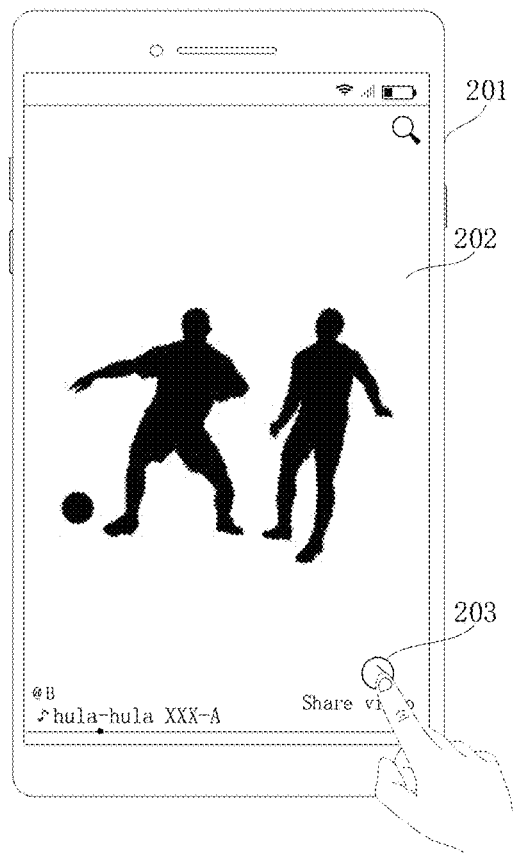
FIG. 2 is a schematic diagram showing an interaction that triggers video sharing according to embodiments of the present disclosure.

FIG. 2 is a schematic diagram showing an interaction that triggers video sharing according to embodiments of the present disclosure.

As shown in FIG. 2, an electronic device 201 displays an information display interface 202 for playing back a target video. A "share Video" button 203 is also displayed in the information display interface 202, which serves as the sharing control for the target video. A user can click on the "share Video" button 203 in the information display interface 202 to share the target video. At that point, the electronic device 201 can automatically generate a composite video containing the target video.

Thus, the electronic device can display an apparent control for quickly sharing the target video in the video presentation interface of the target video, improving the convenience of the user for sharing the target video.

In other embodiments of the present disclosure, the target interaction interface may comprise an video presentation interface of the target video. The target object may comprise the target video.

The video presentation interface is an interface that can be used to playback the target video. In some embodiments, the target object can be displayed in the information display interface of the target video. In this case, the target object may comprise the target video.

In these embodiments, the first trigger operation may comprise a pop-up window trigger operation on the target video, such as a gesture control operation (e.g., a click, a long press, a double-click, etc.), a voice control operation or an emotion control operation to trigger the display of a pop-up function window, and a sharing trigger operation on a share button in the pop-up function window, such as a gesture control operation (e.g., a click, a long press, a double-click, etc.), a voice control operation or an emotion control operation to trigger the sharing of the target video. That is, the user needs to first trigger the display of the pop-up function window in the video presentation interface, and then trigger the sharing of the target video based on a share button in the pop-up function window.

Figure 3:
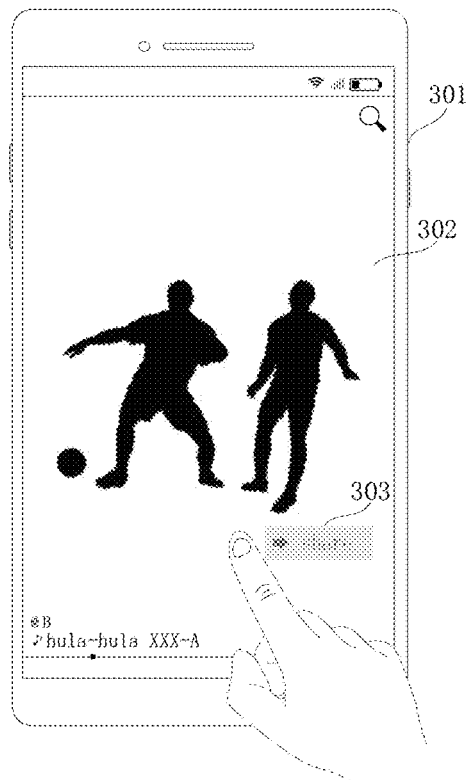
FIG. 3 is a schematic diagram showing another interaction that triggers video sharing according to embodiments of the present disclosure.

FIG. 3 is a schematic diagram showing another interaction that triggers video sharing according to embodiments of the present disclosure.

As shown in FIG. 3, an electronic device 301 displays an video presentation interface 302 for playing back a target video, in response to users want to share the target video, a long press and hold operation can be performed on the target video. At that point, the electronic device 301 can display a pop-up function window 303, in which a "share" button can be displayed. The user can click on the "share" button to share the target video. At that point, the electronic device 301 can automatically generate a composite video containing the target video.

Thus, a convenient operation for quickly sharing a target video is provided for the user, which can improve the convenience of the user for sharing the target video.

In some embodiments of the present disclosure, the target interaction interface may comprise an information display interface, and the target object may comprise a sharing control for the target video.

The information display interface is an interface that can be used to display prompt information.

In some embodiments, S110 may comprise: displaying prompt information and a sharing control in the information display interface.

Prompt information can be used to prompt the presence of the target video in historically posted videos.

In some embodiments, the prompt information may comprise at least one of an interactive message or a broadcast message.

In some embodiments, if the prompt information is an interactive message, the information display interface can be an interactive message display interface, which can be an interface for displaying interactive messages received by the user.

In some embodiments, an interactive message may be displayed in the interactive message display interface to prompt the presence of the target video in historically posted videos, and the target object may be displayed in the box of the interactive message. In this case, the target object may comprise a sharing control for the target video. For example, the sharing control for the target video may be a share button of the target video or a share icon of the target video.

In these embodiments, the first trigger operation may comprise a gesture control operation (such as a click, a long press, a double click, etc.) on the sharing control for the target video, a voice control operation, or an emotion control operation.

Figure 4:
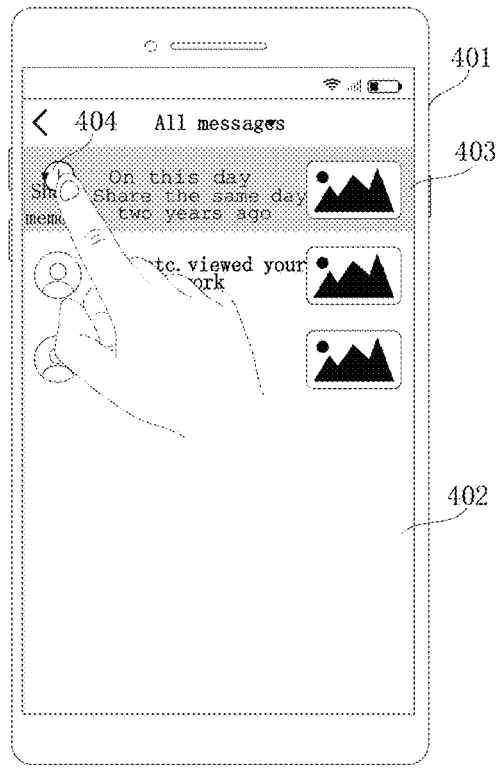
FIG. 4 is a schematic interface diagram of an information display interface according to embodiments of the present disclosure.

FIG. 4 is a schematic interface diagram of an information display interface according to embodiments of the present disclosure.

As shown in FIG. 4, an electronic device 401 displays an interactive message display interface 402 for the user. In the interactive message display interface 402, there is an "On this day" interactive message 403 displayed, which is used to prompt the user to share a target video posted on the same day two years ago. In addition, a "share Memories" button 404 is also displayed in the box of the interactive message "On this day" 403, which serves as the sharing control for the target video. The user can click on the "share Memories" button 404 in the interactive message display interface 402 to share the target video. At that point, the electronic device 401 can automatically generate a composite video containing the target video.

Thus, the electronic device can display an apparent control for quickly sharing the target video in the interactive message display interface, improving the convenience of the user for sharing the target video.

In other embodiments, in the case that the prompt information is a broadcast message, the information display interface can be an video presentation interface for any video, which can be an interface for playing back a video.

In some embodiments, a broadcast message indicating the presence of the target video in historically posted videos can be displayed in the video presentation interface of any video in the form of a broadcast, and the target object can be displayed in the box of the broadcast message. In this case, the target object may comprise a sharing control for the target video. For example, the sharing control for the target video may be a share button of the target video or a share icon of the target video.

In these embodiments, the first trigger operation may comprise a gesture control operation (such as a click, a long press, a double click, etc.) on the sharing control for the target video, a voice control operation, or an emotion control operation.

Thus, the electronic device can display an apparent control for quickly sharing the target video in the information display interface, thereby improving the convenience of the user for sharing the target video.

In some embodiments of the present disclosure, the target interaction interface may comprise a video presentation interface of the target video, and the target object may comprise a sharing control for the target video.

In some embodiments, in a case that there is only one target video, the video presentation interface can be an information display interface of the target video. The video presentation interface is an interface that can be used to play back the target video. In some embodiments, the target video and the target object can be displayed in the information display interface of the target video. In this case, the target object may comprise a sharing control for the target video.

In these embodiments, the first trigger operation may comprise a gesture control operation (such as a click, a long press, a double click, etc.) on the sharing control for the target video, a voice control operation, or an emotion control operation.

In other embodiments, in a case that there are two or more target videos, the video presentation interface can be a video preview interface. The video preview interface is an interface that can be used to display a list of target videos or icons of target videos. In some embodiments, the target object can be displayed in the video presentation interface. In this case, the target object may comprise a sharing control of a target video.

In these embodiments, the first trigger operation may comprise a gesture control operation (such as a click, a long press, a double click, etc.) on a sharing control for the target video, a voice control operation, or an emotion control operation.

In some embodiments of the present disclosure, before S110, the video sharing method may further comprise: displaying prompt information.

Correspondingly, S110 may comprise: in response to a third trigger operation on the prompt information is detected, displaying a sharing control for the target video in the video presentation interface.

The prompt information is used to indicate the presence of the target video in historically posted videos.

In some embodiments of the present disclosure, the third trigger operation may be an operation used to trigger access to a video presentation interface.

In these embodiments, the third trigger operation may comprise a gesture control operation (such as a click, a long press, a double click, etc.) on the prompt information, a voice control operation, or an emotion control operation.

In some embodiments, the prompt information comprises at least one of an interactive message or a broadcast message.

In some embodiments, in a case that the prompt information is an interactive message, the electronic device can display interactive messages received by the user in an interactive message display interface.

Figure 5:
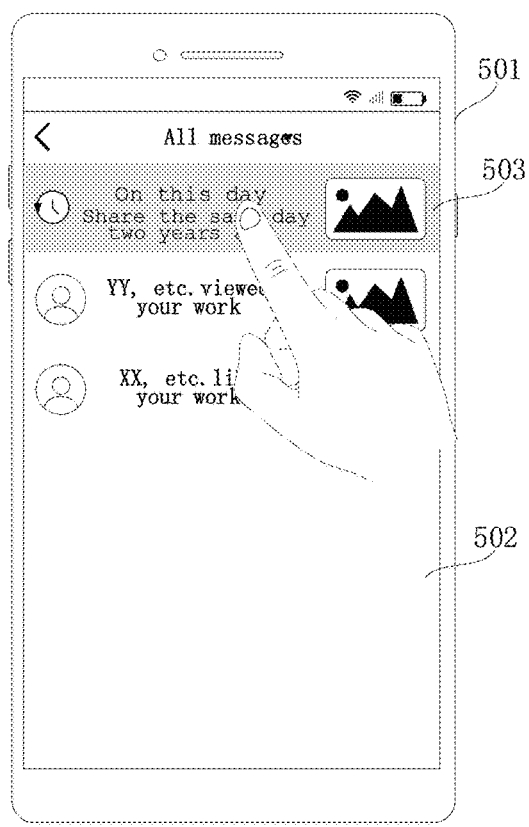
FIG. 5 is a schematic interface diagram of another information display interface according to embodiments of the present disclosure.

FIG. 5 is a schematic interface diagram of another information display interface according to embodiments of the present disclosure.

As shown in FIG. 5, an electronic device 501 displays an interactive message display interface 502 for the user. In the interactive message display interface 502, there is an "On this day" interactive message 503 displayed, which is used to prompt the user to share a target video posted on the same day two years ago. The user can click on the "On this day" interactive message 503 in the interactive message display interface 502 to display the video presentation interface shown in FIG. 6 or FIG. 7 on the electronic device 501.

Figure 6:
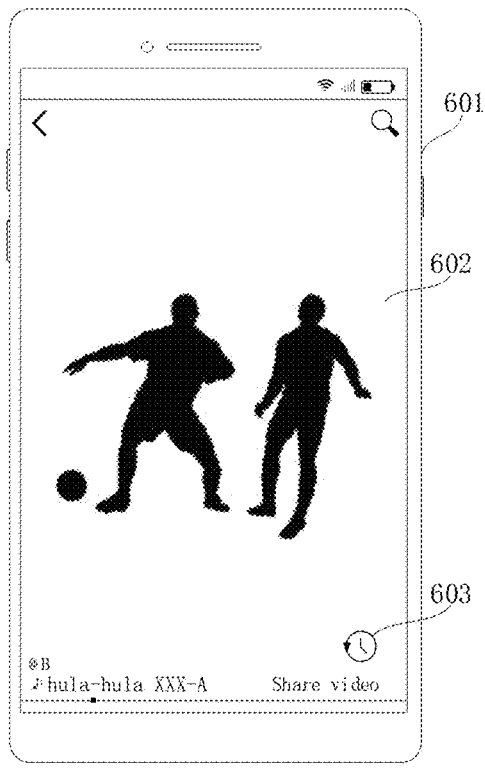
FIG. 6 is a schematic interface diagram of a video presentation interface according to embodiments of the present disclosure.

FIG. 6 is a schematic interface diagram of a video presentation interface according to embodiments of the present disclosure.

As shown in FIG. 6, an electronic device 601 displays an video presentation interface 602 for playing back a target video. A "share Memories" button 603 is also displayed in the information display interface 602, which serves as the sharing control for the target video. The user can click on the "share Memories" button 603 in the information display interface 602 to share the target video. At that point, the electronic device 601 can automatically generate a composite video containing the target video that is being played back in the information display interface 602. In other embodiments, the user may also access the video presentation interface shown in FIG. 6 from a list of historical works to share a target video.

Figure 7:
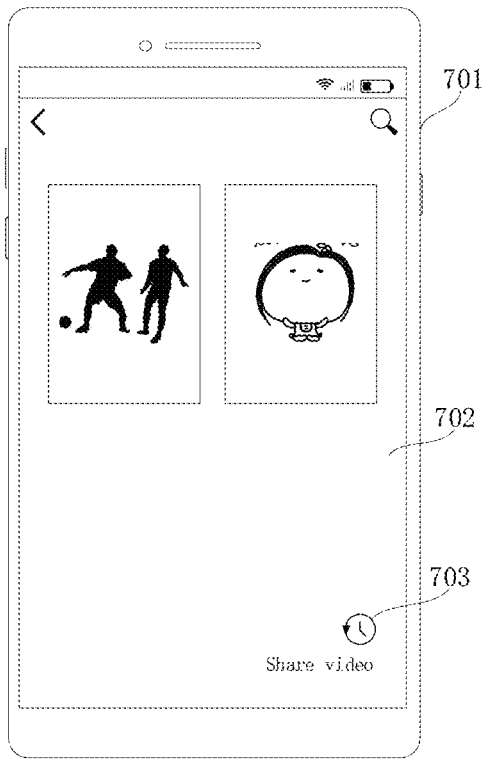
FIG. 7 is a schematic interface diagram of another video presentation interface according to embodiments of the present disclosure.

FIG. 7 is a schematic interface diagram of another video presentation interface according to embodiments of the present disclosure.

As shown in FIG. 7, an electronic device 701 displays a video preview interface 702 that displays icons of two target videos. A "share Memories" button 703 is also displayed in the video preview interface 702, which serves as a sharing control for the target videos. The user can click on the "share Memories" button 703 in the video preview interface 702 to share the two target videos displayed in the video preview interface 702. At that point, the electronic device 701 can automatically generate a composite video containing the two target videos displayed in the information display interface 702.

In some embodiments, the user can also choose and share any one of the two target videos. For example, if the user clicks and selects one of the target videos, and then clicks the "share Memories" button 703, the selected target video can be shared, causing the electronic device 701 to automatically generate a composite video containing the selected target video.

In other embodiments, in a case that the prompt information is a broadcast message, the electronic device can display broadcast messages received by the user in the video presentation interface of any video, which will not be repeated herein.

In other embodiments of the present disclosure, the target videos are displayed in the composite video in different ways for different numbers of target videos.

In embodiments of the present disclosure, one target video can be displayed in the composite video. In this case, the target video can be displayed in the composite video in a picture-in-picture mode.

Figure 8:
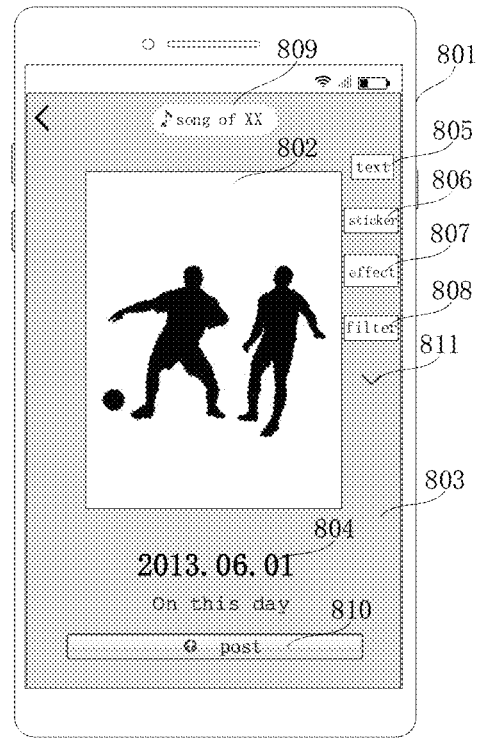
FIG. 8 is a schematic interface diagram of a video preview interface according to embodiments of the present disclosure.

FIG. 8 is a schematic interface diagram of a video preview interface according to embodiments of the present disclosure.

As shown in FIG. 8, the electronic device 801 displays a preset playing interface, in which a composite video 803 automatically generated based on a target video 802 may be displayed. The target video 802 is displayed in the composite video 803 in a picture-in-picture mode.

In other embodiments of the present disclosure, a plurality of target videos can be displayed in a composite video.

In some embodiments, in response to the number of target videos is 2 or more, the target interaction interface can be a video preview interface. The video preview interface is an interface that can be used to display a list of target videos or icons of target videos. In this case, the target object can comprise a plurality of target videos and a sharing control for the target videos.

In some embodiments, the first trigger operation may comprise a gesture control operation (such as a click, a long press, a double click, etc.) on the sharing control for the target videos, a voice control operation, or an emotion control operation.

In some embodiments, a plurality of target videos can be displayed simultaneously in the composite video in a picture-in-picture mode. That is, a plurality of target videos may be arranged in the video frames of the composite video.

Figure 9:
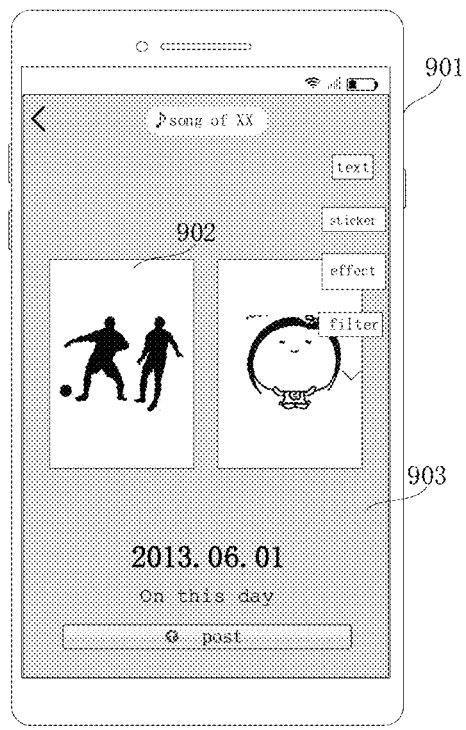
FIG. 9 is a schematic interface diagram of another video preview interface according to embodiments of the present disclosure.

FIG. 9 is a schematic interface diagram of another video preview interface according to embodiments of the present disclosure.

As shown in FIG. 9, the electronic device 901 displays a preset playing interface, in which a composite video 903 automatically generated based on two target videos 902 may be displayed. The two target videos 902 are displayed simultaneously in the composite video 903 in a picture-in-picture mode.

In other embodiments, a plurality of target videos can be displayed one by one in the composite video. That is, a plurality of target videos can be displayed one by one in the composite video. In this case, the preset playing interface may be as shown in FIG. 8.

In still another embodiment of the present disclosure, the visualization materials may comprise images and/or text generated based on the relevant content of the target video.

In these embodiments, the electronic device can generate visualization materials based on the target video after detecting the first trigger operation on the target object and before displaying a preset playing interface, and generate a composite video for display in the preset playing interface based on the target video and the visualization materials.

In some embodiments of the present disclosure, the visualization materials may comprise a first visualization material, and the relevant content may comprise an associated image of the target video. The associated image of the target video can comprise at least one of a cover image or a key frame of the target video.

In embodiments of the present embodiment, the first visualization material can be displayed in a first picture area of the composite video.

In some embodiments, the first picture area of the composite video may be a partial or entire picture area of the composite video, which is not limited in the present disclosure.

In the case where the first picture area is the entire picture area of the composite video, the first visualization material may be a background image covering the entire picture area of the composite video.

In the case where the first picture area is a partial picture area of the composite video, the first visualization material may be a background image covering a partial picture area of the composite video.

In some embodiments, the target video can be displayed in a second picture area of the composite video.

In some embodiments, the second picture area of the composite video may be a partial or entire picture area of the composite video, which is not limited in the present disclosure.

In the case where the second picture area is the entire picture area of the composite video, the target video can cover the entire picture area of the composite video.

In the case where the second picture area is a partial picture area of the composite video, the target video can cover a partial picture area of the composite video.

In some embodiments, at least a portion of the second picture area may be comprised in the first picture area, so that a portion of the target video displayed within the first picture area covers the first visualization material, that is, at least a portion of the target video can cover the background image of the composite video.

In some embodiments, in the case where the first picture area is the entire picture area of the composite video, the target video may produce a picture-in-picture effect relative to the background image of the composite video, so that the composite video for sharing and the shared target video have differentiated features, so as to improve the recognition of video sharing.

In embodiments of the present embodiment, the first visualization material may comprise a background image generated based on a color feature of an associated image of the target video.

For example, after the electronic device detects a first trigger operation on the target object, it can first identify a color with the most pixels or colors with an amount of pixels that is greater than a preset threshold in the associated image of the target video. Then, a color that falls within a preset color gamut is selected from the identified colors, and a background image, as a background material, having a pure color or a gradient color is generated based on the selected color. Then, a composite video is generated based on background material.

It should be noted that the preset threshold and the preset color gamut can be set according to the user's needs, which is not limited in the present disclosure.

In some embodiments, the electronic device can also select a color used to generate a background image based on the subject color, color luminance, color brightness, and color saturation of the associated image of the target video, generate a background image based on the selected color, and then generate a composite video based on the background material.

Therefore, in the embodiments of the present disclosure, color matching between the background image of the composite video and the video frames of the target video can be improved, thereby improving the aesthetics of the composite video.

In other embodiments of the present disclosure, the visualization materials may comprise a second visualization material, and the relevant content of the target video may comprise associated information of the target video. The second visualization material can comprise associated information of the target video.

In some embodiments, the associated information may comprise at least one of: the posting time of the target video, the name of the poster of the target video, or comment information of the target video.

In these embodiments, the second visualization material may comprise text. For example, the second visualization material may comprise at least one of the posting time of the target video, the name of the poster of the target video, or comment information of the target video, which is displayed as a sticker.

For example, after the electronic device detects a first trigger operation on the target object, it can directly obtain the text of at least one of the posting time of the target video, the name of the poster of the target video, or comment information of the target video. Based on the obtained text, a sticker corresponding to the second visualization material can be generated, and then a composite video can be generated based on the second visualization material.

In embodiments of the present disclosure, in the case where the target video is a video historically posted by the user who triggered the generation of a composite video, after the electronic device detects a first trigger operation on the target object, the posting time of the target video can be obtained, and a sticker corresponding to the second visualization material can be generated based on the obtained posting time, and then a composite video can be generated based on the second visualization material.

Referring to FIG. 8, the preset playing interface can also display a date sticker 804, which can be used to display the posting time of the target video 802, i.e., "Jun. 1, 2013".

In embodiments of the present embodiment, the comment information of the target video can be a comment content on the target video issued by the user who generates the composite video, or it can be a general comment content specified in advance according to needs, which is not limited in the present embodiment.

In some embodiments, in the case where the comment information of the target video is a comment content on the target video issued by the user who generates the composite video, the electronic device can read the comment content on the target video issued by the target user after detecting a first trigger operation on the target object, so as to obtain the comment information of the target video.

Figure 10:
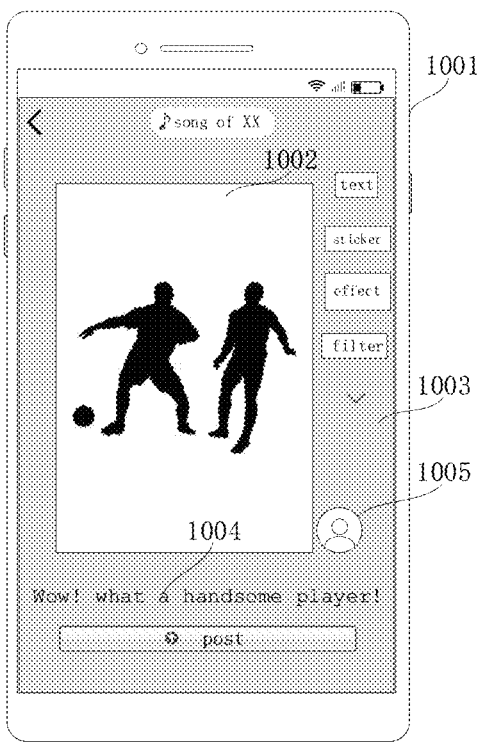
FIG. 10 is a schematic interface diagram of still another video preview interface according to embodiments of the present disclosure.

FIG. 10 is a schematic interface diagram of another video preview interface according to embodiments of the present disclosure.

As shown in FIG. 10, the electronic device 1001 displays a preset playing interface, in which a composite video 1003 automatically generated based on a target video 1002 may be displayed. The target video 1002 is displayed in the composite video 1003 in a picture-in-picture mode. In addition, a comment sticker 1004 can be also displayed in the composite video 1003, the comment sticker 1004 being used to display the target user's comment content on the target video 1002, i.e., "Wow! what a handsome player!"

In some embodiments, in the case where the comment information of the target video is a general comment content, the electronic device can directly obtain the general comment content after detecting a first trigger operation on the target object, so as to obtain the comment information of the target video.

Referring to FIG. 8 again, in the case where the target video 802 is a video posted by the user on the same day many years ago, a comment sticker can also be displayed in the preset playing interface, which can be used to display a general comment content "On this day".

In some embodiments, the associated information may also comprise the poster's avatar of the target video.

Correspondingly, the second visualization material may also comprise an image. For example, the second visualization material can comprise the poster's avatar displayed as a sticker.

For example, after the electronic device detects a first trigger operation on a target object, it can also obtain an avatar of the poster of the target video, generate a sticker corresponding to the second visualization material based on the poster's avatar, and then generate a composite video based on the second visualization material.

Referring to FIG. 10 again, the preset playing interface can also display an avatar sticker 1005, which can be used to display the avatar of the poster of the target video 1002.

In still other embodiments of the present disclosure, in order to further lower the threshold of video creation and to provide users with simpler and convenient video editing functions, the electronic device can receive the user's second trigger operation on the composite video, and after detecting the second trigger operation on the composite video, the composite video is edited according to an editing method corresponding to the second trigger operation.

In some embodiments of the present disclosure, the second trigger operation may comprise an attribute adjustment operation on the target video to achieve editing of the video frame of the composite video.

Correspondingly, editing the composite video according to an editing method corresponding to the second trigger operation may comprise: adjusting the attribute of the target video according to an attribute adjustment method corresponding to the attribute adjustment operation.

The attribute of the target video may comprise the display position of the video frame of the target video, the display size of the video frame, and the display angle of the video frame.

Correspondingly, the attribute adjustment method can comprise at least one of I, II or III.

I. Adjustment of the Display Position of the Video Frame of the Target Video

For example, the user can drag the video frame of the target video to change the display position of the video frame according to the user's drag operation, and finally display the video frame of the target video at the position where the user stops the drag operation.

II. Adjustment of the Display Size of the Video Frame of the Target Video

For example, the user can make a gesture to zoom in or zoom out the video frame of the target video, causing the display size of the video frame of the target video to change according to an operation method of the gesture.

III. Adjustment of the Display Angle of the Video Frame of the Target Video

The display angle refers to a rotation angle of the video frame of the target video.

For example, the user can make a rotation gesture on the video frame of the target video, causing the display angle of the video frame of the target video to change according to the operation method of the gesture.

In other embodiments of the present disclosure, the second trigger operation may also comprise a video capture operation on the target video to achieve editing of the video frame of the composite video.

The video capture operation can comprise an operation of triggering a video intercepting mode, an operation of selecting a video segment, and an operation of confirming the selection result.

For example, the operation of triggering a video intercepting mode may comprise a gesture control operation (such as a click, a long press, a double click, etc.), a voice control operation, or an emotion control operation on the Video Interception control for entering the video intercepting mode. The operation of selecting a video segment may comprise a gesture control operation (such as a drag or click, etc.), a voice control operation, or an emotion control operation on at least one of a start time pointer and an end time pointer of a duration selector control for selecting a start time and an end time of the video segment. The operation of confirming the selection result may comprise a gesture control operation (such as, a click, a long press, a double click, etc.), a voice control operation, or an emotion control operation on a confirm control for triggering video intercepting.

Correspondingly, editing the composite video according to an editing method corresponding to the second trigger operation may comprise: replacing the target video in the composite video with a video clip captured from the target video through the video capture operation.

Referring to FIG. 8, a drop-down button 811 is displayed in the preset playing interface, which can be used to display function buttons that are not currently being displayed, such as a video intercepting button. The user can click the drop-down button 811 to display the Video intercepting button on the electronic device 801, and then click on the Video intercepting button to display the video intercepting interface shown in FIG. 11 on the electronic device 801.

Figure 11:
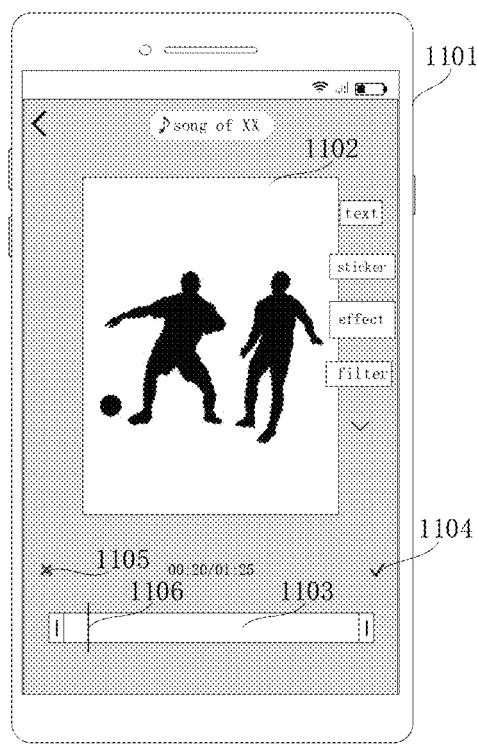
FIG. 11 is a schematic diagram showing an interaction for video intercepting according to embodiments of the present disclosure.

FIG. 11 is a schematic diagram showing an interaction for video intercepting according to embodiments of the present disclosure.

As shown in FIG. 11, the electronic device 1101 displays a video intercepting interface, which comprises a preview window 1102 of the target video, a Duration Selector panel 1103, a Confirm icon 1104, and a Cancel icon 1105. The user can drag the start time pointer 1106 on the Duration Selector panel 1103 to select a video frame corresponding to the start time of the video segment. During the process of dragging the start time pointer 1106 by the user, the video frame displayed in preview window 1102 changes with the timestamp corresponding to the start time pointer 1106. After the user confirms the completion of video intercepting, the Confirm icon 1104 can be clicked to cause the electronic device 1101 to use the selected video segment as the video clip captured from the target video after intercepting, and to display the video clip captured from the target video in the composite video displayed in the preset playing interface shown in FIG. 8. If the user does not want to intercept the target video, the Cancel icon 1105 can be clicked to return the electronic device 1101 to the preset playing interface shown in FIG. 8, and the electronic device 1101 will continue to display the target video before entering the video intercepting interface in the composite video.

In still other embodiments of the present disclosure, the second trigger operation may also comprise an operation of selecting background music for the composite video to achieve background music editing for the composite video.

The background music selection operation can comprise an operation of selecting a target audio.

Correspondingly, editing on the composite video according to an editing method corresponding to the second trigger operation may comprise: changing the background music of the composite video from the background music of the target video to the target audio selected by the background music selection operation.

Referring to FIG. 8, the preset playing interface can also display a Background Music Selector control 809, which can display the title of the current background music. The user can click on the Background Music Selector control 809 to display a background music selection panel on the electronic device 801, and can click on a favorite target audio on the background music selection panel, to cause the electronic device 801 to replace the background music of the composite video with the target audio, and to display the title of the background music corresponding to the target audio on the Background Music Selector control 809.

In some embodiments of the present disclosure, the second trigger operation may also comprise a material replacement operation for a first target visualization material of the visualization materials to achieve visualization material editing.

For example, the first target visualization material may be any visualization material to be replaced by the user in the composite video, which is not limited in the present disclosure.

The material replacement operation can be an operation of replacing an image to be replaced. For example, the image can comprise a background image and an image sticker.

Correspondingly, editing on the composite video according to an editing method corresponding to the second trigger operation may comprise: replacing a first target visualization material subject to the material replacement operation with a target material selected by the material replacement operation.

In the case where the first target visualization material is a background image, the user can click on the background image to cause the electronic device to display a background image selection panel. The user can click on a favorite target background image on the background image selection panel to replace the background image of the composite video with the target background image on the electronic device.

In some embodiments of the present disclosure, the second trigger operation may also comprise a material modification operation on a second target visualization material of the visualization materials to achieve visualization material editing.

Correspondingly, editing on the composite video according to an editing method corresponding to the second trigger operation may comprise: according to a material modification method corresponding to the material modification operation, modifying a second target visualization material subject to the material modification operation.

For example, the second target visualization material may be any visualization material that can be edited by the user in the composite video, which is not limited in the present disclosure.

The material modification method can comprise at least one of the following I, II, III, IV, V or VI.

I. Modification of the Material Content of the Second Target Visualization Material Modifying the material content of the second target visualization material can comprise modifying the second target visualization material, such as the text in a comment sticker.

The material modification operation can comprise an operation of editing the text to be modified.

Figure 12:
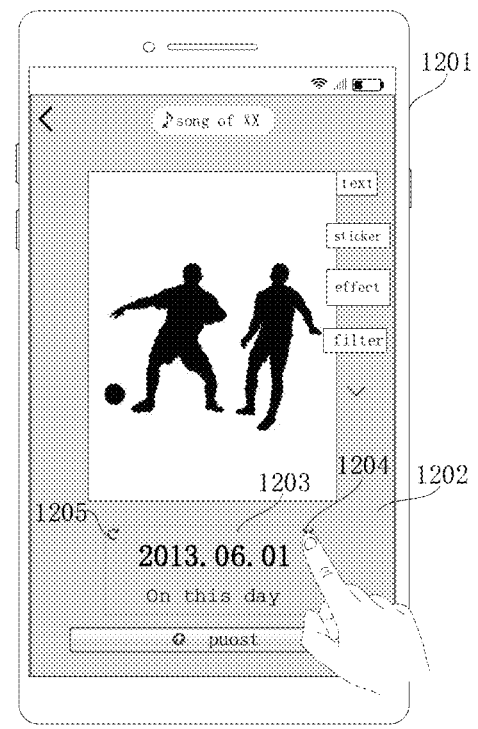
FIG. 12 is a schematic diagram showing an interaction for material modification according to embodiments of the present disclosure.

FIG. 12 is a schematic diagram showing an interaction for material modification according to embodiments of the present disclosure.

As shown in FIG. 12, the electronic device 1201 can display a preset playing interface 1202, in which a comment sticker 1203 can be displayed. The user can click on the comment sticker 1203 to make it selected, in response to the comment sticker 1203 is selected, the user can modify the text in comment sticker 1203 to modify the displayed content of the comment sticker 1203.

II. Modification of the Display Size of the Second Target Visualization Material For example, the user can make a zoom-in or zoom-out gesture on the second target visualization material to be modified, so that the display size of the second target visualization material changes according to the operation method of the gesture.

III. Modification of the Display Position of the Second Target Visualization Material For example, the user can drag the second target visualization material to be moved, causing the display position of the second target visualization material to change according to the user's drag operation, and finally displaying the second target visualization material at the position where the user stops the drag operation.

IV. Modification of the Display Angle of the Second Target Visualization Material The display angle refers to a rotation angle of the second target visualization material.

Referring to FIG. 12, the electronic device 1201 can display the preset playing interface 1202, in which a comment sticker 1203 can be displayed. The user can click on the comment sticker 1203 to display a Rotate icon 1205. The user can click on the Rotate icon 1205 to change the rotation angle of the comment sticker 1203.

V. Addition of a Second Target Visualization Material

Adding a second target visualization material can comprise newly adding a second target visualization material, that is, the second target visualization material is a visualization material that is newly added to the composite video by the user. For example, the second target visualization material can be an image or text displayed as a sticker.

The material modification operation can comprise an operation of adding the second visualization material.

Figure 13:
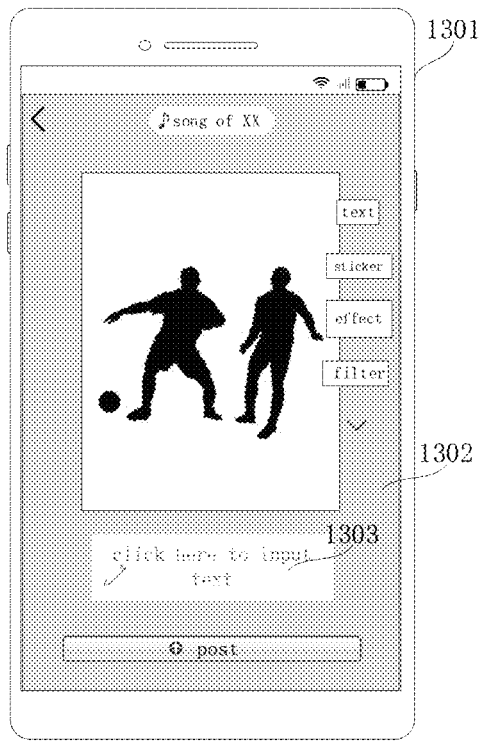
FIG. 13 is a schematic diagram showing another interaction for material modification according to embodiments of the present disclosure.

Referring to FIG. 8, the preset playing interface can also display a Text button 805 and a Sticker button 806. The Text button 805 can be used to add a new text sticker, and the Sticker button 806 can be used to add a new image sticker. The user can click on the Text button 805 to add a new text sticker to the composite video 803, as shown in FIG. 13. The user can also click on the Text button 805 to display an image sticker selection panel on the electronic device 801. The user can click on a favorite image sticker within the image sticker selection panel, to enable an image sticker clicked by the user to be added to the composite video 803.

FIG. 13 is a schematic diagram showing another interaction for material modification according to embodiments of the present disclosure.

As shown in FIG. 13, the electronic device 1301 can display a preset playing interface 1302, in which a composite video can be displayed. The composite video can have a new text sticker 1303, in which the user can edit the text to be added.

VI. Deletion of a Second Target Visualization Material

Deleting a second target visualization material can comprise deleting the second target visualization material, such as deleting any existing image sticker or text sticker.

The material modification operation can comprise a deleting operation of the second visualization material.

Referring to FIG. 12, the electronic device 1201 can display the preset playing interface 1202, in which a comment sticker 1203 can be displayed. The user can click on the comment sticker 1203 to display a Delete icon 1204. The user can click on the Delete icon 1204 to delete the comment sticker 1203.

In some embodiments of the present disclosure, the user may also edit the composite video. Referring to FIG. 8, an Effect button 807 and a Filter button 808 can also be displayed in the preset playing interface. The Effect button 807 can be used to add effects to the composite video 803 or the target video 802, and the Filter button 808 can be used to add a filter to the composite video 803 or the target video 802.

In order to enable the user to interact with other users within the composite video, embodiments of the present disclosure also provides another video sharing method.

Figure 14:
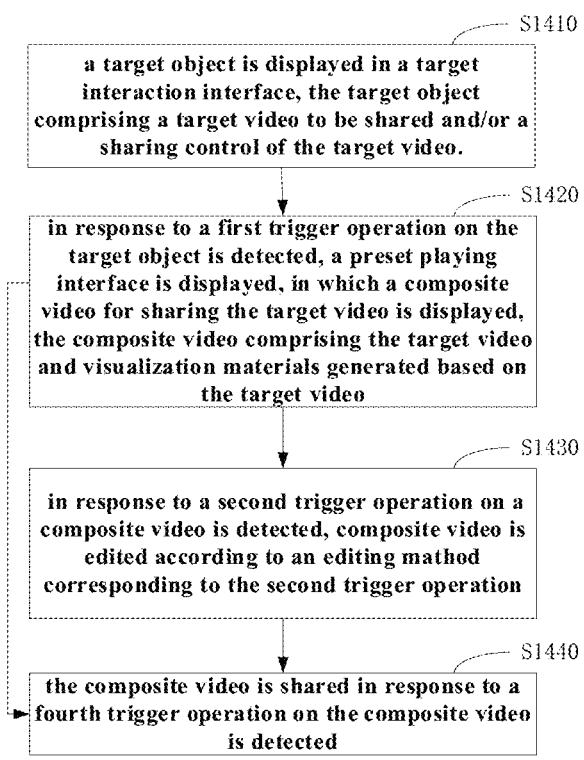
FIG. 14 is a flowchart of another video sharing method according to embodiments of the present disclosure.

FIG. 14 is a flowchart of another video sharing method according to embodiments of the present disclosure.

As shown in FIG. 14, the video sharing method may comprise the following steps.

In S1410, a target object is displayed in a target interaction interface, the target object comprising a target video to be shared and/or a sharing control for the target video.

The target video is a historically posted video.

In S1420, in response to a first trigger operation on the target object is detected, a preset playing interface is displayed, in which a composite video for sharing the target video is displayed, the composite video comprising the target video and visualization materials generated based on the target video.

In S1430, in response to a second trigger operation on a composite video is detected, the composite video is edited according to an editing method corresponding to the second trigger operation.

S1410 to S1430 are similar to S110 and S130 of the embodiment described above, and will not be repeated herein.

In S1440, the composite video is shared in response to a fourth trigger operation on the composite video is detected.

In this embodiment of the present embodiment, in response to the user confirms that the composite video can meet the desired effect, a fourth trigger operation can be input to the electronic device. The fourth trigger operation can be an operation used to trigger the sharing of the composite video. The composite video is shared in response to a fourth trigger operation on the composite video is detected by the electronic device.

In some embodiments of the present disclosure, the fourth trigger operation may comprise a gesture control operation (such as a click, a long press, a double click, etc.) on the composite video, a voice control operation, or an emotion control operation.

In other embodiments of the present disclosure, the fourth trigger operation may also comprise a gesture control operation (such as a click, a long press, a double click, etc.) on a sharing control of the composite video, a voice control operation, or an emotion control operation. The sharing control of the composite video may be a control used to trigger the sharing of the composite video. For example, the control may be an object that can be triggered by a user, such as a button, an icon, etc.

In embodiments of the present embodiment, sharing the composite video may comprise at least one of the following operations.

I. Posting of the composite video within a first application to which the target interaction interface belongs.

The first application can be any type of application.

For example, the first application can be a short video application to which the target interaction interface belongs, and sharing the composite video can be accomplished by posting the composite video within the short video application to which the target interaction interface belongs, so that the composite video can be distributed to other users using the short video application or stored as a private video in a server of the short video application.

Referring to FIG. 8, a "Post as DailyLife" button 810 can be displayed in the preset playing interface, which is a sharing control of the composite video 803. in response to the user wants to share the final edited composite video 803, the "Post as DailyLife" button 810 can be clicked to post the composite video 803 as a daily video.

II. Posting of the composite video within a second application other than the first application.

The second application can be any type of application other than the first application to which the target interactive interface belongs.

For example, the second application can be a social application other than a short video application to which the target interaction interface belongs, and sharing a composite video can be accomplished by posting the composite video to the social platform of the social application.

III. Sending the Composite Video to at Least One Target User

Sharing the composite video may comprise sending the composite video to the user's chat interface with at least one target user in the first application, to the user's chat interface with at least one target user in the second application, or to a communication account of at least one target user through an instant messaging tool.

Therefore, in the embodiment of the present disclosure, a composite video can be shared in a variety of forms, so that a user can post the composite video as a normal work to receive positive feedback from others, such as views and interactions.

In other embodiments of the present disclosure, after S1440, the video sharing method may further comprise: in a case that interactive information about the composite video is received, overlaying an Interactive Information display control on the composite video, wherein the Interactive Information display control can be generated based on the interactive information.

For example, users who have viewed the composite video can post interactive information about the composite video in the video presentation interface of the composite video. After receiving the interactive information about the composite video, the server can send the interactive information about the composite video to the electronic device of the user who posted the composite video, allowing the electronic device to generate an Interactive Information display control for the composite video based on the interactive information. This Interactive Information display control can be used to display the interactive information about the composite video, allowing the user who posted the composite video to view interactive information of users who have viewed the composite video and interacted with the user within the composite video.

In some embodiments, the Interactive Information display control can be used to interact with the poster of the interactive information.

For example, within the Interactive Information display control, the poster of the composite video can interact with a poster who has posted interactive information that is interesting to the poster, for example, by giving him a like or posting comments.

In summary, the embodiments of the present disclosure can provide a simple and convenient sharing method to enable a user to quickly share video content. In addition, the embodiments of the present disclosure can enable the composite video shared by the user and the original target video to have differentiated features, so as to improve the recognition of video sharing. The background image of the composite video is generated based on the color features of video frames of the target video, which can improve color matching for the composite video, and thereby improve the aesthetics of the composite video. Furthermore, the user can also the target video is edited in the preset playing interface according to an editing method corresponding to a second trigger operation, to enrich the shared content to meet the personalized needs of the user. Therefore, the threshold of video production can be lowered, so that the shared content can still achieve the expected effect of the user even for a user with insufficient creation skills. Moreover, the shared target video can be posted by the user as a composite video, allowing viewers to interact with the poster within the composite video.

Embodiments of the present disclosure further provides a video sharing apparatus, which will be described below with reference to FIG. 15.

In the embodiments of the present disclosure, the video sharing apparatus may be an electronic device. The electronic device may comprise, but is not limited to, a mobile terminal, such as a mobile phone, a notebook computer, a digital broadcast receiver, a PDA, a PAD, a PMP, a vehicle-mounted terminal (such as a vehicle-mounted navigation terminal), a wearable device, etc., or a fixed terminal such as a digital TV, a desktop computer, a smart home device, etc.

Figure 15:
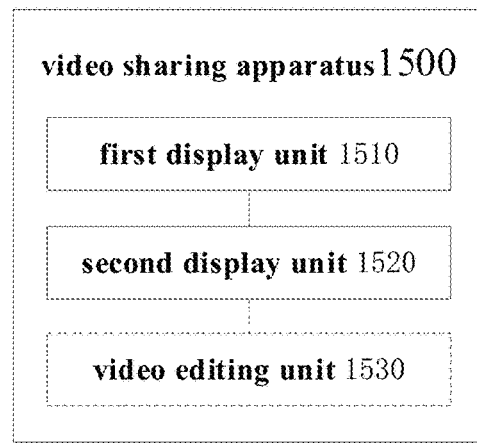
FIG. 15 is a schematic structural diagram of a video sharing apparatus according to embodiments of the present disclosure.

FIG. 15 shows a schematic diagram of the structure of a video sharing apparatus according to embodiments of the present embodiment.

As shown in FIG. 15, the video sharing apparatus 1500 may comprise a first display unit 1510, a second display unit 1520.

In some embodiments, the video sharing apparatus 1500 may further comprise a video editing unit 1530.

The first display unit 1510 is configured for displaying a target object in a target interaction interface, the target object comprising a target video to be shared and/or a sharing control for the target video, wherein the target video is a historically posted video.

The second display unit 1520 is configured for, in response to a first trigger operation on the target object is detected, displaying a preset playing interface, in which a composite video for sharing the target video is displayed, the composite video comprising the target video and visualization materials generated based on the target video.

The video editing unit 1530 is configured for, in response to the second trigger operation on the composite video is detected, editing the composite video according to an editing method corresponding to the second trigger operation.

In the embodiments of the present disclosure, in response to a user triggers video sharing of a target video, a preset playing interface can be directly displayed. The preset playing interface can display a composite video that is automatically generated based on the target video, and comprises the target video and visualization materials. By sharing the target video using the composite video, there can be a significant difference in the presentation form between the composite video and the target video, which enables viewers to distinguish between the original video and the shared video by the presentation form of the video, thereby improving the recognition of video sharing. Moreover, the user can also edit the target video according to an editing method corresponding to the second trigger operation in the preset playing interface, to enrich the shared content to meet the personalized needs of the user, so that the threshold of video production can be lowered, so that the shared content can still achieve the expected effect of the user even for a user with insufficient skills.

In some embodiments of the present disclosure, the visualization materials comprise images and/or text generated from the target video.

In some embodiments of the present disclosure, the visualization materials may comprise a first visualization material that can be displayed in the first picture area of the composite video. The target video may be displayed in a second picture area of the composite video, wherein all or a portion of the second picture area can be comprised in the first screen area, and a portion of the target video displayed in the first picture area can be superimposed on the first visualization material.

In some embodiments of the present disclosure, the visualization materials may comprise a second visualization material, which may comprise associated information of the target video.

In some embodiments, the associated information may comprise at least one of: the posting time of the target video, the name of the poster of the target video, or comment information of the target video.

In some embodiments, the second trigger operation can be used to trigger editing of at least one of: a video frame of the composite video, a background music of the composite video, or a visualization material.

In some embodiments of the present disclosure, the second trigger operation may comprise an attribute adjustment operation on the target video.

The video editing unit 1530 may comprise a first editing sub-unit, which can be configured to adjust the attribute of the target video according to an attribute adjustment method corresponding to the attribute adjustment operation.

The attribute adjustment method may comprise at least one of: adjusting the display position of the video frame of the target video, adjusting the display size of the video frame of the target video, or adjusting the display angle of the video frame of the target video.

In some embodiments of the present disclosure, the second trigger operation may comprise a video capture operation on the target video.

The video editing unit 1530 can comprise a second editing sub-unit configured to replace the target video in the composite video with a video clip captured from the target video by the video capture operation.

In some embodiments of the present disclosure, the second trigger operation may comprise an operation of selecting background music for the composite video.

The video editing unit 1530 may comprise a third editing sub-unit configured to change the background music of the composite video from background music of the target video to a target audio selected by the background music selection operation.

In some embodiments of the present disclosure, the second trigger operation may comprise a material replacement operation for a first target visualization material of the visualization materials.

The video editing unit 1530 may comprise a fourth editing sub-unit configured to replace the first target visualization material subject to the material replacement operation with a target material selected by the material replacement operation.

In some embodiments of the present disclosure, the second trigger operation may comprise a material modification operation for a second target visualization material of the visualization materials.

The video editing unit 1530 may comprise a fifth editing sub-unit configured to modify the second target visualization material subject to the material modification operation according to a material modification method corresponding to the material modification operation.

The material modification method can comprise at least one of: modifying the content of the second target visualization material, modifying the display size of the second target visualization material, modifying the display position of the second target visualization material, modifying the display angle of the second target visualization material, adding the second target visualization material, or deleting the second target visualization material.

In some embodiments of the present disclosure, the target interaction interface may comprise an information display interface, and the target object may comprise a sharing control.

The first display unit 1510 can be further configured to display prompt information and the sharing control in the information display interface, the prompt information being used to prompt the presence of the target video in historically posted videos.

In some embodiments of the present disclosure, the target interaction interface may comprise a video presentation interface, and the target object may comprise a sharing control.

The video sharing apparatus 1500 may further comprise a third display unit configured to display prompt information before displaying the target object, the prompt information being used to prompt the presence of the target video in historically posted videos.

The first display unit 1510 may further configured to, in response to a third trigger operation on the prompt information is detected, display a sharing control in the video presentation interface.

In some embodiments of the present disclosure, the target interaction interface may comprise a video preview interface, and the target object may comprise a plurality of target videos.

The plurality of target videos can be arranged in a video frame of the composite video, or the plurality of target videos can be displayed one by one in the composite video.

In some embodiments of the present disclosure, the video sharing apparatus 1500 may further comprise a video sharing unit configured to share the composite video in response to a fourth trigger operation on the composite video is detected after displaying a preset playing interface.

Sharing the composite video may comprise at least one of posting the composite video within a first application to which the target interaction interface belongs, posting the composite video within a second application other than the first application, or sending the composite video to at least one target user.

It should be noted that the video sharing apparatus 1500 shown in FIG. 15 can execute the various steps of the method embodiments shown in FIGS. 1 to 14, and implement the various processes and effects of the method embodiments shown in FIGS. 1 to 14, which will not be repeated herein.

Embodiments of the present disclosure further provide an electronic device, which may comprise a processor and a memory for storing executable instructions. The processor can read the executable instructions from the memory and perform the executable instructions to implement the video sharing method described in the above embodiments.

Figure 16:
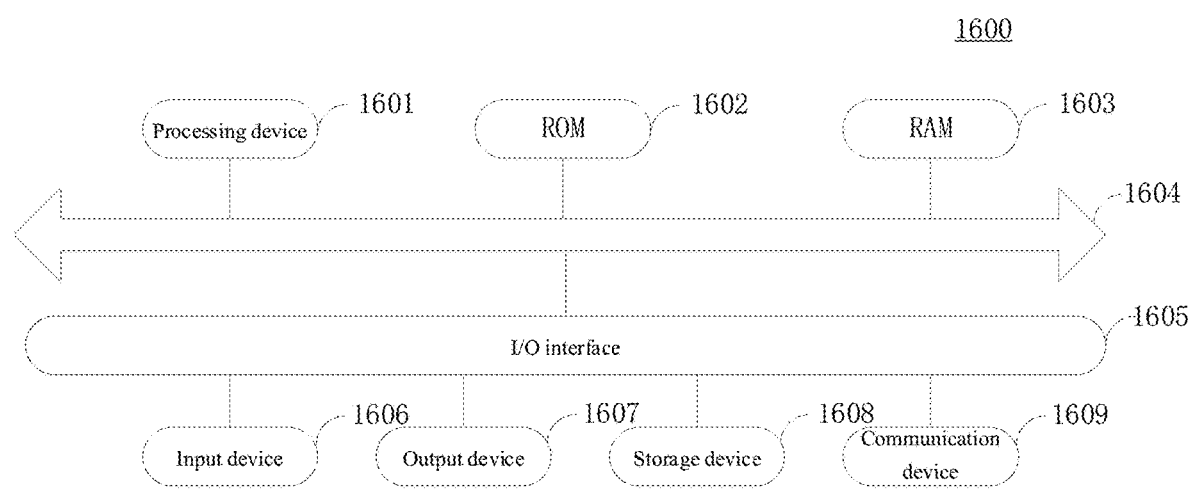
FIG. 16 is a schematic structural diagram of an electronic device according to embodiments of the present disclosure.

FIG. 16 is a schematic structural diagram of an electronic device according to embodiments of the present disclosure. Referring to FIG. 16, a schematic structural diagram of an electronic device 1600 suitable for implementing the embodiments of the present disclosure is shown.

In the embodiment of the present disclosure, the electronic device 1600 may be an electronic device. The electronic device may comprise, but is not limited to, a mobile terminal, such as a mobile phone, a notebook computer, a digital broadcast receiver, a PDA, a PAD, a PMP, a vehicle-mounted terminal (such as a vehicle-mounted navigation terminal), a wearable device, etc., or a fixed terminal such as a digital TV, a desktop computer, a smart home device, etc.

It should be noted that the electronic device 1600 shown in FIG. 16 is only an example, and should not bring any limitation to the function and scope of use of the embodiments of the present disclosure.

As shown in FIG. 16, the electronic device 1600 may comprise a processing device (such as a central processing unit, a graphics processor, etc.) 1601, which can perform various appropriate actions and processes according to a program stored in a read only memory (ROM) 1602, or a program loaded from a storage device 1608 into a random access memory (RAM) 1603. In RAM 1603, various programs and data required for the operation of the electronic device 1600 are also stored. The processing device 1601, ROM 1602, and RAM 1603 are connected to each other through a bus 1604. An input/output (I/O) interface 1605 is also connected to the bus 1604.

Generally, the following devices can be connected to the I/O interface 1605: input devices 1606 comprising, for example, a touch screen, a touch pad, a keyboard, a mouse, a camera, a microphone, an accelerometer, a gyroscope, etc; output devices 1607 comprising a liquid crystal display (LCD), a speaker, a vibrator, etc.; a storage device 1608 such as a magnetic tape, a hard disk, etc; and a communication device 1609. The communication device 1609 enables the electronic device 1600 to communicate wirelessly or wirelessly with other devices to exchange data. Although FIG. 16 shows the electronic device 1600 with various components, it should be understood that it is not required to implement or have all of these components. Alternatively, more or fewer components can be implemented or provided.

Embodiments of the present disclosure further provide a computer readable storage medium storing a computer program thereon, which when executed by a processor, causes the processor to implement the video sharing method described in the above embodiments.

Embodiments of the present disclosure further provide a computer program, comprising: instructions that, when executed by a processor, cause the processor to execute the video sharing method of any embodiment above.

The present disclosure further provides a computer program product comprising instructions that, when executed by a processor, cause the processor to execute the video sharing method of any embodiment above.

In particular, according to embodiments of the present disclosure, the processes described above with reference to the flowchart can be implemented as a computer software program. For example, embodiments of the present disclosure comprises a computer program product, which comprises a computer program carried on a non-transitory computer readable medium, and containing program code for executing the method shown in the flowchart. In such an embodiment, the computer program may be downloaded and installed from the network through the communication device 1609, or installed from the storage device 1608, or from the ROM 1602. When the computer program is executed by the processing device 1601, the above functions defined in the video sharing method according to the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP, and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The aforementioned computer-readable medium carries one or more programs, which when executed by an electronic device, cause the electronic device to perform operations of: displaying a target object in a target interaction interface, the target object comprising a target video to be shared and/or a sharing control for the target video, wherein the target video is a historically posted video; in response to a first trigger operation on the target object is detected, displaying a preset playing interface, in which a composite video for sharing the target video is displayed, the composite video comprising the target video and visualization materials generated based on the target video; in response to the second trigger operation on the composite video is detected, editing the composite video according to an editing method corresponding to the second trigger operation.

In the present disclosure, the computer program code for executing operations of the present disclosure may be complied by any combination of one or more program design languages, the program design languages comprising, but not limited to, object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. The names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

The invention claimed is:

1. A media content sharing method, comprising:
    displaying a target object in a target interaction interface, the target object comprising at least one of a target media content to be shared or a sharing control for the target media content, wherein the target media content is a historically posted media content; and
    displaying a preset playing interface, based on a first trigger operation on the sharing control, wherein a composite media content for sharing the target media content is displayed in the preset playing interface, the composite media content comprising the target media content and a visualization material generated based on the target media content, and the target media content being displayed in an area covering a part of a display area of the composite media content in the preset playing interface.

2. The media content sharing method according to claim 1, wherein the visualization material comprises at least one of an image or text generated based on the target media content.

3. The media content sharing method according to claim 1, wherein the visualization material comprises a first visualization material that is displayed in a first picture area of the composite media content, the target media content being displayed in a second picture area of the composite media content, wherein all or a portion of the second picture area is comprised in the first screen area, and a portion of the target media content displayed in the first picture area is superimposed on the first visualization material.

4. The media content sharing method according to claim 1, wherein the visualization material comprises a second visualization material, the second visualization material comprising associated information of the target media content.

5. The media content sharing method according to claim 4, wherein the associated information comprises at least one of: a posting time of the target media content, a name of a poster of the target media content, or comment information of the target media content.

6. The media content sharing method according to claim 1, wherein the target interaction interface comprises an information display interface, and the target object comprises the sharing control, and
    wherein the displaying the target object in the target interaction interface comprises:
        display prompt information and the sharing control in the information display interface, the prompt information being used to prompt the presence of the target media content in a historically posted media content.

7. The media content sharing method according to claim 1, wherein the target interaction interface comprises a media content presentation interface, and the target object comprises the sharing control,
    the media content sharing method further comprising, before the displaying the target object in the target interaction interface:
        displaying prompt information, the prompt information being used to prompt the presence of the target media content in a historically posted media content; and
    wherein the displaying the target object in the target interaction interface comprises:
        displaying the sharing control in the media content presentation interface, in response to a third trigger operation on the prompt information is detected.

8. The media content sharing method according to claim 1, wherein the target interaction interface comprises a media content preview interface, and the target object comprises a plurality of target media contents,
    the plurality of target media contents are arranged in media content frame of the composite media content, or the plurality of target media contents are displayed one by one in the composite media content.

9. The media content sharing method according to claim 1, further comprising, after the displaying a preset playing interface:
    sharing the composite media content in response to a fourth trigger operation on the composite media content is detected,
    wherein the sharing the composite media content comprises at least one of: posting the composite media content within a first application to which the target interaction interface belongs, posting the composite media content within a second application other than the first application, or sending the composite media content to at least one target user.

10. An electronic device, comprising:
    a processor;
    a memory for storing executable instructions;
    wherein the processor is configured to read the executable instructions from the memory and perform the executable instructions to implement following steps of:
        displaying a target object in a target interaction interface, the target object comprising at least one of a target media content to be shared or a sharing control for the target media content, wherein the target media content is a historically posted media content; and
        displaying a preset playing interface, in response to a first trigger operation on the sharing control, wherein a composite media content for sharing the target media content is displayed in the preset playing interface, the composite media content comprising the target media content and a visualization material generated based on the target media content, and the target media content being displayed in an area covering a part of a display area of the composite media content in the preset playing interface.

11. A non-transitory computer-readable storage medium stored thereon a computer program that, when executed by a processor, causes the processor to implement following steps of:
displaying a target object in a target interaction interface, the target object comprising at least one of a target media content to be shared or a sharing control for the target media content, wherein the target media content is a historically posted media content, and the historically posted media content is a public media content already distributed through a server, or a private media content posted and saved to the server; and
displaying a preset playing interface, in response to a first trigger operation on the sharing control, wherein a composite media content for sharing the target media content is displayed in the preset playing interface, the composite media content comprising the target media content and a visualization material generated based on the target media content, and the target media content being displayed in an area covering a part of a display area of the composite media content in the preset playing interface.

12. The media content sharing method according to claim 1, further comprising:
editing the composite media content according to an editing method corresponding to a second trigger operation, in response to the second trigger operation is detected.

13. The media content sharing method according to claim 12, wherein the second trigger operation is used to trigger editing of at least one of media content frame of the composite media content, background music of the composite media content, or the visualization material.

14. The media content sharing method according to claim 12, wherein the second trigger operation comprises an attribute adjustment operation on the target media content, wherein the editing the composite media content according to the editing method corresponding to the second trigger operation comprises:
adjusting an attribute of the target media content according to an attribute adjustment method corresponding to the attribute adjustment operation, the attribute adjustment method comprising at least one of: adjusting a display position of a media content frame of the target media content, adjusting a display size of a media content frame of the target media content, or adjusting a display angle of a media content frame of the target media content.

15. The media content sharing method according to claim 12, wherein the second trigger operation comprises a media content capture operation on the target media content, and wherein the editing the composite media content according to the editing method corresponding to the second trigger operation comprise:
replacing the target media content in the composite media content with a media content clip captured from the target media content through the media content capture operation.

16. The media content sharing method according to claim 12, wherein the second trigger operation comprises a background music selection operation on the composite media content, and
wherein the editing the composite media content according to an editing method corresponding to the second trigger operation comprise:
changing background music of the composite media content from background music of the target media content to a target audio selected by the background music selection operation.

17. The media content sharing method according to claim 12, wherein the second trigger operation comprises a material replacement operation on a first target visualization material of the visualization material, and
wherein the editing the composite media content according to the editing method corresponding to the second trigger operation comprise:
replacing the first target visualization material subject to the material replacement operation with a target material selected by the material replacement operation.

18. The media content sharing method according to claim 12, wherein the second trigger operation comprises a material modification operation on a second target visualization material of the visualization material, and
wherein the editing the composite media content according to the editing method corresponding to the second trigger operation comprise:
modifying the second target visualization material subject to the material modification operation, according to a material modification method corresponding to the material modification operation, the material modification method comprising at least one of: modifying material content of the second target visualization material, modifying a display size of the second target visualization material, modifying a display position of the second target visualization material, modifying a display angle of the second target visualization material, adding the second target visualization material, or deleting the second target visualization material.

* * * * *